United States Patent [19]

Sugihara

[11] Patent Number: 4,554,601

[45] Date of Patent: Nov. 19, 1985

[54] MODE SWITCH OPERATING DEVICE FOR TAPE RECORDER

[75] Inventor: Masanori Sugihara, Saitama, Japan

[73] Assignee: Pioneer Electronic Corporation, Tokyo, Japan

[21] Appl. No.: 413,660

[22] Filed: Sep. 1, 1982

[30] Foreign Application Priority Data

| Sep. 2, 1981 | [JP] | Japan | 56-130471[U] |
| Sep. 2, 1981 | [JP] | Japan | 56-130474[U] |
| Sep. 2, 1981 | [JP] | Japan | 56-130475[U] |
| Sep. 2, 1981 | [JP] | Japan | 56-130476[U] |
| Sep. 2, 1981 | [JP] | Japan | 56-130477[U] |

[51] Int. Cl.$^4$ ............................................. G11B 15/00
[52] U.S. Cl. ........................................ 360/90; 360/137; 242/200
[58] Field of Search ................ 360/96.1, 96.3–96.4, 360/96.5, 90, 93, 70, 105, 137, 69

[56] References Cited

U.S. PATENT DOCUMENTS

| 4,018,404 | 4/1977 | Sami | 360/137 X |
| 4,131,922 | 12/1978 | Yoshida et al. | 360/90 |
| 4,229,772 | 10/1980 | Muramatsu | 360/69 |

Primary Examiner—John H. Wolff
Attorney, Agent, or Firm—Sughrue, Mion, Zinn, Macpeak & Seas

[57] ABSTRACT

A cassette tape recorder is provided with mode selection levers which are selectively engageable and retainable to achieve operation in a plurality of recorder modes. Playback and record modes are released either by the operation of a stop lever or an eject lever. A pause mode is provided which may be associated with other modes, such as the record mode. When progressing from a record/pause mode to a stop mode, the record mode lever is released first, so as to avoid inadvertant operation in the record mode before achieving the stop mode.

13 Claims, 5 Drawing Figures

MODE SWITCH OPERATING DEVICE FOR TAPE RECORDER

BACKGROUND OF THE INVENTION

The present invention relates to a mode switch operating device for a tape recorder.

In prior art tape recorders, the tape recorder is provided with a flywheel in the drive transmission system from the motor to the capstan in order to stably rotate the capstan.

Therefore, in order to feed the tape at a predetermined speed, the flywheel or the like must be rotated at a constant speed. In order to meet this requirement, the flywheel must be enlarged, that is, the diameter thereof and the weight, particularly, on the circumferential parts must be increased.

However, in a tape recorder, particularly, in a built-in radio type, in which the overall size is compact, it is difficult to enlarge the size of the flywheel. As one problem, this is due to the fact that the mode operating levers are provided in a certain arrangement.

More specifically, in the most generally used mode operating mechanism for tape recorders of this type, the mode operating levers are arranged in a direction vertical to the longitudinal direction of the rectangular chassis. For this reason, the necessary mechanisms corresponding to the stroke motions of the mode operating levers must be positioned correspondingly, and the flywheel must be small in size in view of the stroke motion of the levers.

In tape recorders, an operating mode switch means for freely selecting the various modes is provided, and the respective modes may be retained once the corresponding switch is actuated. However, in general, the retaining function is not offered for the pause mode, i.e., often the pause mode is retained by continuously depressing the pause button with manual force. Therefore, in order to release the pause mode selected during the record mode, for example, it is sufficient to release the pause mode button. But in the case where the switch operations may be achieved by an electrical power switch system using plungers, it is necessary to provide means for releasing the pause mode only and returning the condition to the record mode.

Also, with the pause mode of the above described system, for example, if after the pause mode is selected during the record mode, the stop mode is desired, there is a fear that the pause mode might be released and thereafter the record mode presented instantaneously with the stop mode.

Also, in prior art tape recorders, there is provided a fast forward mode, a rewind mode, a playback mode, a record mode and a pause mode, and there is also provided a stop mode for releasing the selected above described modes. In addition, an eject mode mechanism is provided independently of the above described modes. For this reason, for example, in the case where the cassette used in the playback mode is stopped and ejected from the tape recorder, firstly, the stop mode allows the playback mode to be released and thereafter, the eject operation is conducted. If the eject operation is directly selected without the stop mode therebetween, the cassette case is removed in the playback mode in which various parts are positioned for reproduction, causing various problems, such as damage to the mechanism and the tape.

Also, recently, it is known to simplify the mode operation by incorporating electrical means with the switch operating means. In this case, the eject mode may be achieved by the electrical means and its manual operation may be achieved by a light force as with the other mode operation buttons. However, if the electric supply is interrupted during operation in a given mode, it is impossible to operate the stop mode mechanism and moreover, it is impossible to actuate the eject mode mechanism, so that the cassette may not be removed from the tape recorder at all.

In the prior art tape recorder, since the eject means is often not dependent on the other mode retaining and release mechanisms at all, even if the cassette door is opened by the eject operation and the cassette is removed therefrom, the respective modes are retained in operation. For this reason, the tape recorder mechanism or the tape might be damaged by the erroneous retention of the mechanism when a cassette is set therein.

SUMMARY OF THE INVENTION

Accordingly, in view of the above noted defects, an object of the present invention is to provide a tape recorder characterized in that the mode operating levers are arranged so as not to interfere with the flywheel and are arranged in the longitudinal direction of the chassis to thereby enable enlargment of the flywheel.

Another object of the present invention is to provide, in a tape recorder switching modes by means of plungers, a mode switch operating device in which it is effective to release only the pause mode from the record pause mode to return the mode to the record mode. The present invention is characterized in that retainer projections are formed on the mode operation levers, and a retainer mechanism composed of a pair of plates is adapted to retain the retainer projections to freely select any mode.

The present invention is characterized in that in a tape recorder for switching modes by the use of plungers, when the record pause mode is released, the pause mode is released after the record mode. For this purpose, the retaining mechanism for retaining the pause mode is released later than those of the other retained mode mechanisms.

A further object of the present invention is to provide an eject device for a tape recorder, in which the eject operation may be achieved by one operation manually applied to the eject layer, where, in the same manner as in the operation of the stop mode, mode release may be achieved by the eject lever operation.

Another object of the present invention is to provide an eject device for a tape recorder in which where the cassette is removed by the eject lever operation, the retainer means for the other operating modes are released, to prevent erroneous operation.

DETAILED DESCRIPTION OF THE PREFERRED EMBODIMENTS

Figure 1:
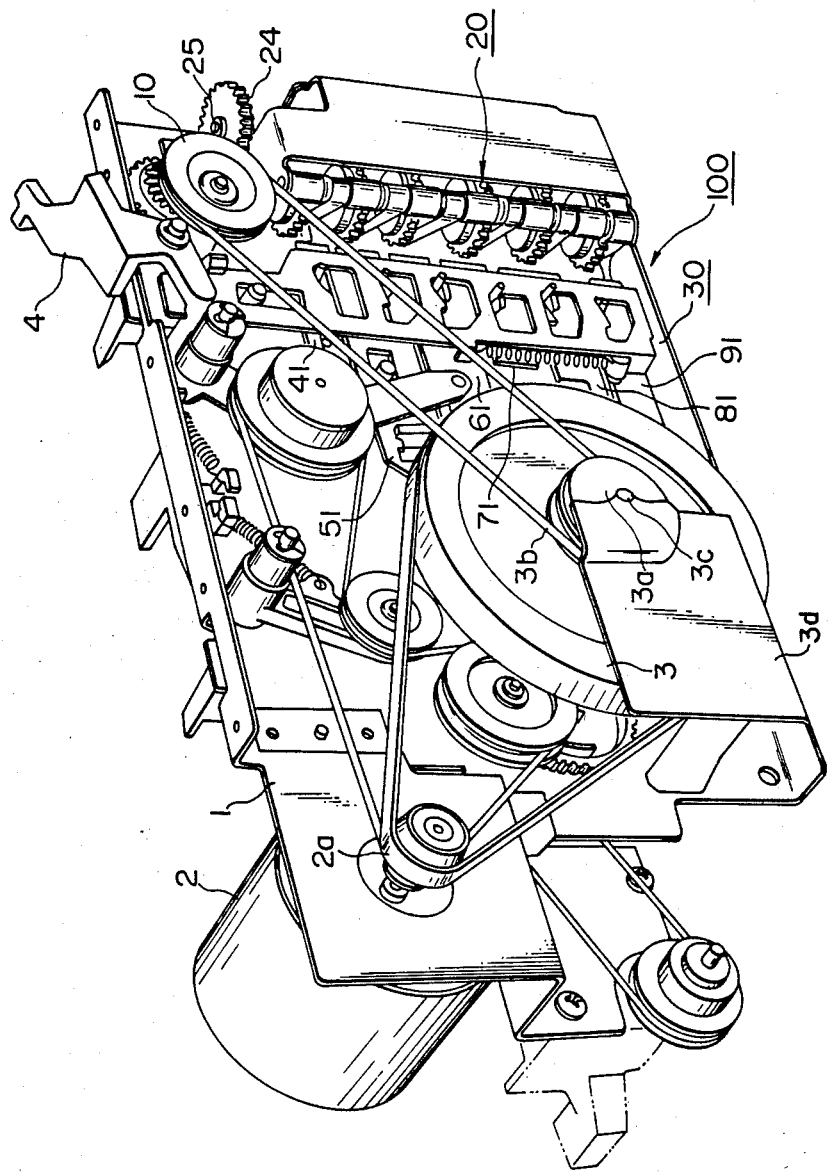
FIG. 1 is a perspective view showing an inner mechanism of a tape recorder according to the present invention.

The present invention will now be described by way of example with reference to the accompanying drawings. FIG. 1 is a perspective view showing an inner mechanism of a tape recorder according to the present invention, in which a motor 2 is mounted on a chassis 1 and output power of the motor 2 is transmitted through a belt 2a to a flywheel 3, whereby a capstan is driven by rotation of the flywheel 3. A belt 3b is laid between a pulley mounted on the flywheel 3 and an input pulley 10 of a switch operating means 100, so that the switch operating means (described below) is driven by the rotation of the input pulley 10 as desired.

Figure 2:
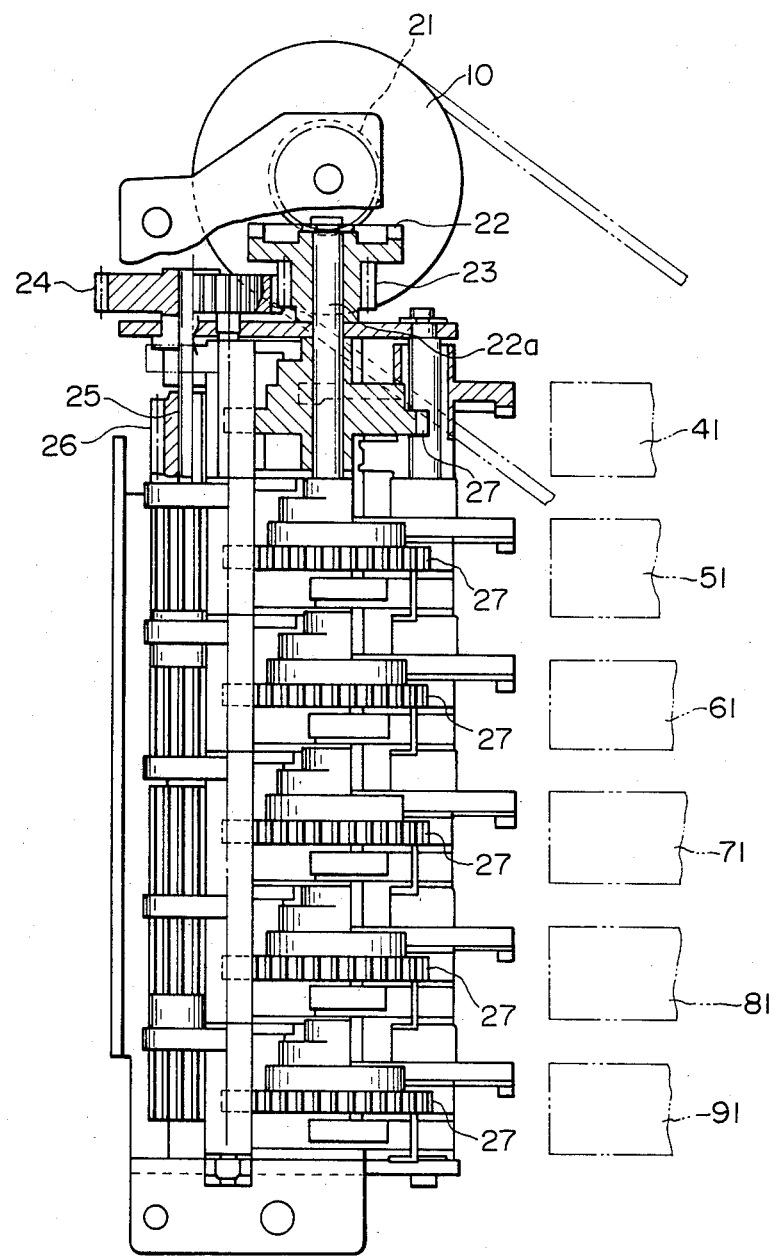
FIG. 2 is a side view showing in partial cross section a part of a mode switch operating means.
Figure 3:
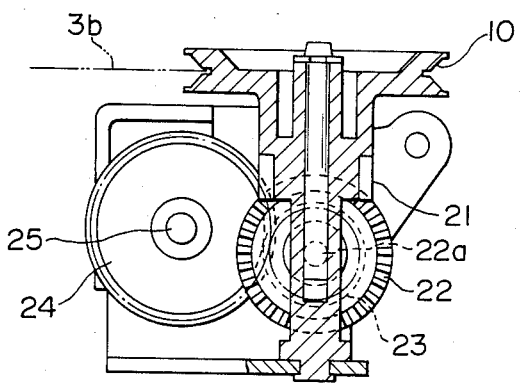
FIG. 3 is a plan view of the means shown in FIG. 2.
Figure 4:
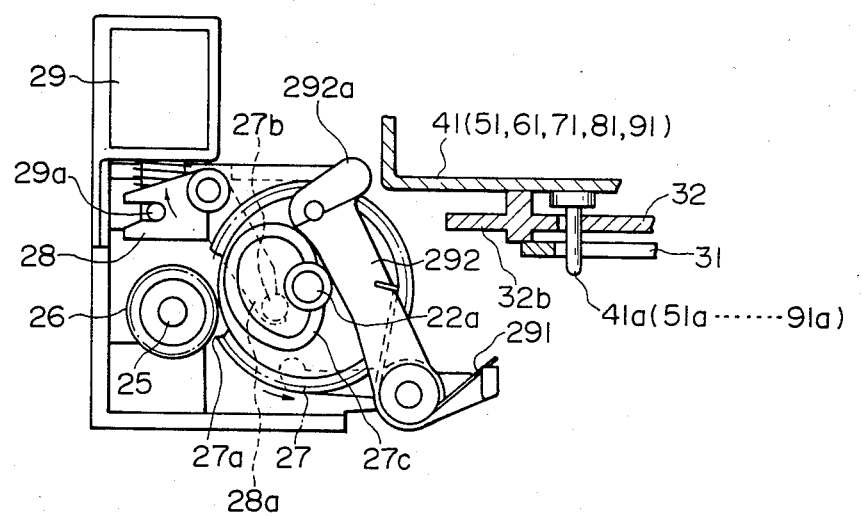
FIG. 4 is a horizontal cross sectional view of the means shown in FIG. 2.

The switch operating means 100 is composed of a switch drive mechanism 20 and a retainer mechanism 30. In the switch drive mechanism, 20, a pinion 21 formed on a boss portion of the above described input pulley 10 is provided with a crown gear 22, as shown in FIGS. 2 and 3. The crown gear 22 is provided at its boss portion with a pinion 23 which meshes with a spur gear 24. A longitudinally extending shaft 25 is fixedly inserted into a hole formed in a boss portion of the spur gear 24. A drive gear 26 is formed along the longitudinally extending shaft 25. In a multiple manner, a clutch gear 27 for each operation mode which is independently provided is mounted on a center shaft 22a of the aforesaid crown 22 in parallel with the longitudinally extending shaft of the drive gear 26. As shown in FIG. 4, a non-toothed portion 27a is formed on the clutch gears 27, which are drivingly engageable with the aforesaid drive gear 26 except for the non-toothed portion. A retainer pin 27b extends from an underside of the clutch gear 27 and engages a retainer end 28a of a lock arm 28 pivotally supported on the chassis 1 to thereby control the rotation of the clutch gear 27. The other end of the lock arm 28 is engaged with an engagement pin 29a formed on the rod of a plunger 29. Retraction of the plunger 29 causes the aforesaid lock arm 28 to rotate in the clockwise direction in the drawing so that the engagement of the retainer end 28a of the lock arm 28 with the retainer pin 27b is released.

A cam 27c is formed on an upper surface of each clutch gear 27 to rotate together therewith. An actuating arm 292 biased to be in contact with a periphery of the cam portion 27c by the force of a torsion spring 291 is provided for each operating mode. The actuating arm 292 is pivotally supported on the chassis 1 and is provided at its end with a push portion 292a which may push an associated mode lever, i.e., any one of the stop mode operating lever 41, fast forward mode operating lever 51, rewind mode operating lever 61, pause mode operating lever 71, playback mode operating lever 81 and the record mode operating lever 91.

Figure 5:
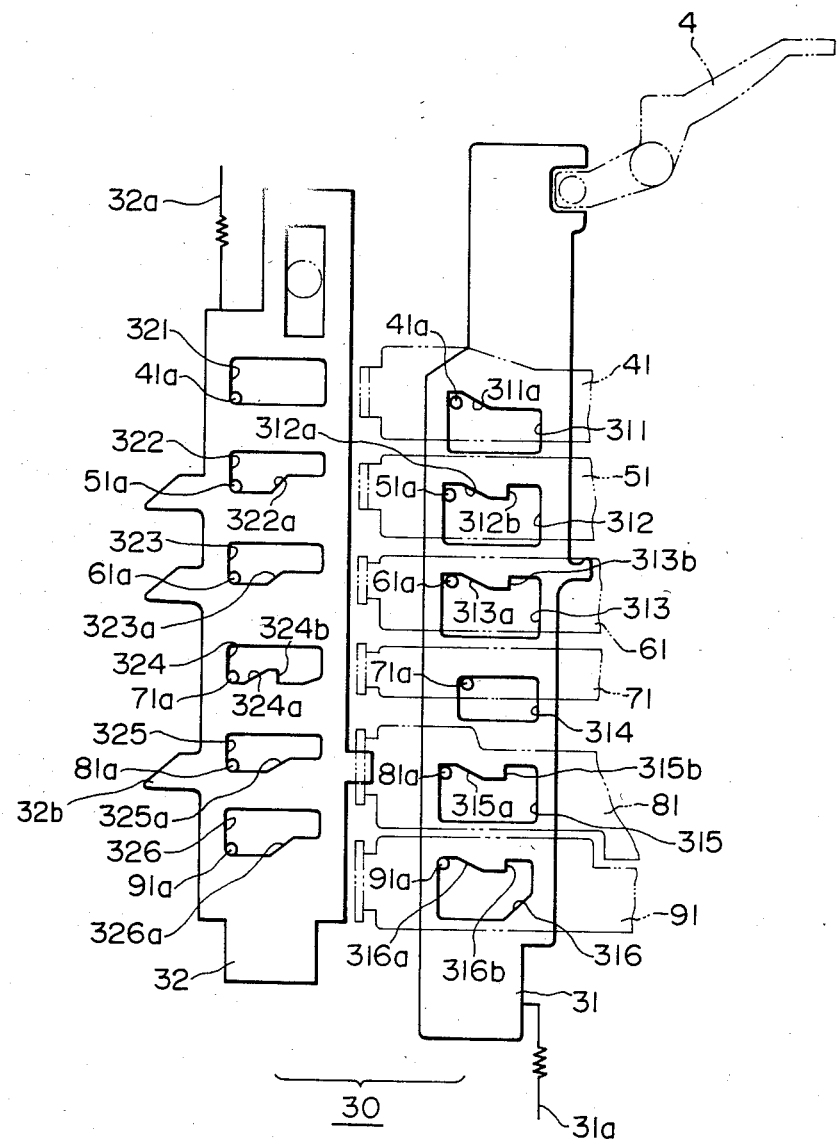
FIG. 5 is a side view showing in detail in an exploded view how the respective mode levers are retained or released.

The above described respective mode operating levers 41, 51, 61, 71, 81, and 91 are disposed in parallel to each other in the horizontal direction in the noted order from the upper portion to the lower portion, and are each provided with retainer means 30 at an intermediate portion in the longitudinal direction of the mode operating lever. As shown in FIG. 5, the retainer means 30 comprises a longitudinally extending retainer plate 31 passing over all the mode operating levers 41, 51, 61, 71, 81, and 91 and a retainer slider 32. The retainer plate 31 and the retainer slider 32 are laid on each other and are movable in the vertical direction intersecting the moving direction of the mode operating levers (FIG. 5 is an exploded view of the retainer means for readily understanding their configuration). The retainer plate 31 is urged to move downwardly by a spring 31a whereas the retainer slider 32 is urged to move in the opposite direction, i.e., upwardly, by a spring 32a. An eject lever 4 is provided at an upper end of the retainer plate 31 so that upon its operation, the retainer plate 31 is moved upwardly against the force of the spring 31a.

In the retainer plate 31, there are formed window holes 311, 312, 313, 314, 315 and 316 corresponding to the respective mode operating levers 41, 51, 61, 71, 81 and 91. Also in the retainer slider 32, there are formed window holes 321, 322, 323, 324, 325 and 326 which overlap with the above described window holes. A retainer pin 41a formed integrally with the stop mode operating lever 41 is disposed in an overlapping area of the window holes 311 and 321, a retainer pin 51a formed integrally with the fast forward mode operating lever 51 is disposed in an overlapping area of the window holes 312 and 322, a retainer pin 61a formed integrally with the rewind mode operating lever 61 is disposed in an overlapping area of the window holes 313 and 323, a retainer pin 71a formed integrally with the pause mode operating lever 71 is disposed in an overlapping area of the window holes 314 and 324, a retainer pin 81a formed integrally with the playback mode operating lever 81 is disposed in an overlapping area of the window holes 315 and 325, and a retainer pin 91a formed integrally with the record mode operating lever 91 is disposed in an overlapping area of the window holes 316 and 326.

Thus, when the respective mode operating levers are actuated, the respective integral retainer pins 41a, 51a, 61a, 71a, 81a and 91a are correspondingly moved within the window holes of the retainer plate 31 and the retainer slider 32. In this case, the fast forward mode operating lever 51, the rewind mode operating lever 61, the playback mode operating lever 81 and the record mode operating lever 91 may be retained by their retainer pins by the retainer plate 31. For this reason, in the window hole 312 corresponding to the fast forward mode operating lever 51, since the retainer plate 31 is biased to move downwardly, a cam projection 312a for guiding the retainer pin and a retaining step 312b are formed on an upper periphery thereof. When the mode operating lever 51 is actuated, the retainer pin 51a is guided while the retainer plate 31 is lifted slightly by the cam projection 312a. Then, the retainer pin 51a is retained at the retaining step 312b to thereby maintain the selected operation mode. In the same way, the window holes 313, 315 and 316 are provided with cam projections 313a, 315a and 316a and retaining steps 313b, 315b and 316b corresponding to the rewind, playback and record modes, respectively.

For the window hole 311 corresponding to the stop mode operating lever 41, it is required only that the retainer plate 31 be moved downwardly to release the engagement between the above described retainer pins and the retaining steps. For this reason, only a cam projection 311a is provided at an upper periphery of the window hole 311. Incidently, the operation by which the stop mode operating lever 41 is actuated to push the retainer plate 31 using the retainer pin 41a and the cam projection 311a is identical in effect to the operation of the eject lever 4 provided at the upper end of the retainer plate 31. Thus, the respective retaining operations of the mode operating levers may be released by the eject lever 4.

Furthermore, since the pause mode operating lever 71 is actuatable both before and after the other operating levers and independently thereof, the means for releasing and maintaining the operation of the pause mode is provided not on the retainer plate 31 but on the retainer slider 32. Namely, in the window hole 324 corresponding to the pause mode operating lever 71 of the retainer slider 32, since the retainer slider 32 is biased to move upwardly, a cam projection 324a and a retaining step 324b are formed on a lower periphery thereof in the same manner as described above. Also, in order to release the retained pause mode, a taper projection 32b is formed on the retainer slider 32. The retainer slider 32 is lowered through the taper projection 32b by the above described actuating arm 292 (FIG. 4) to thereby release the engagement between the pin 71a and the retaining step 324b. A suitable mechanism may be used to lower the slider when the stop mode is selected.

In the tape recorder according to the present invention, as described above, the respective mode operating levers 41 to 91 constituting the mode operating mechanism are linearly movable in the longitudinal direction on one side of the chassis through guide means. The linear movement of each operating mode is directed in the longitudinal direction of the chassis 1. The above described flywheel 3 is disposed remote from the surface of the chassis, maintaining movement space for the respective mode operating levers 41 to 91. A rotary shaft 3c of the flywheel 2 is supported by a bearing shaft 3d mounted on the chassis 1 at a predetermined location. Incidntally, the above described rotary shaft 3c is formed integrally with the capstan disposed on the opposite side of the chassis 1.

With such a construction, the flywheel deviates from the paths of the strokes of the respective mode operating levers 41 to 91. Therefore, space for the operations of the mode operating levers may be sufficiently maintained to thereby enlarge the flywheel without preventing the operation of the respective mechanisms.

As is apparent from the foregoing, in the tape recorder according to the present invention, since the respective mode operating levers are moved in the longitudinal direction of the chassis and the flywheel is provided out of the region where the operating levers are moved, it is possible to use a large flywheel.

Reference numeral 4 denotes an eject lever which is constructed so that any of the retaining pins 51a, 61a, 71a, 81a and 91a retained by the retainer plate 31 are released by the eject lever 4 in the ejection of the cassette case.

When the plunger 29 is energized corresponding to the record mode, the lock arm 28 is rotated by the plunger so that the engagement between it and the clutch gear 27 and the retainer pin 27b is released to thereby engage the clutch gear 27 with the drive gear 26. Upon the rotation of the clutch gear 27, the recording mode operating lever 91 is pushed via the cam 27c and moved so that the retainer pin 91a is also moved along the cam portion 316a of the window hole 316.

The movement of the retainer pin 91a causes the retainer plate 31 to be moved upwardly against the force of the spring 31a. When the retainer pin 91a passes through the cam portion 316a, the upward movement of the retainer plate 31 is stopped by the retainer pin 91a.

At this time as the retainer plate 31 is moved downwardly by the force of the spring 31a, the retainer pin 91a is retained at the retaining portion or step 316b. The movement of the record mode operating lever 91 causes the playback mode operating lever 81 to move together therewith. During the record mode, the playback mode operating lever 81 is also actuated. Namely, the retainer pin 91a is retained at the retaining step 315b of the window hole 315.

Under these conditions, when the solenoid 29 of the pause mode is activated, in the same manner as in the above described record mode operation, the pause mode operating lever 71 is pushed by the actuating arm 292. However, during the pause operation, the window hole 314 of the retainer plate 31 has no retaining ability, but the retainer pin 71a is retained by the step 324b of the window hole 324 of the retainer slider 32, thereby maintaining the pause condition.

In releasing of the pause mode, the solenoid for the playback mode, which is already in the retained condition, is activated to thereby push the playback mode operating lever 81 via the actuating arm 292 thereof; however, since the playback mode operating lever 81 is already retained, the cam portion 32b of the retainer slider 32 is merely pushed by the actuating arm 292 of the playback mode to thereby move the retainer slider 32 downwardly. This operation releases the pause mode.

When it is desired to change the record pause mode to the stop mode, by the operation of the stop mode operating lever 41, the retainer plate is moved once upwardly, and therefore, the motion of the retainer plate 31 allows the release of the pause mode.

In this case, if the pause mode is released before the release of the record mode, even for a moment, the record mode is achieved. Therefore, in order to prevent this defect, the retaining step of the pause mode is made longer than the record mode retaining step. Thus, the timing of the release of the pause mode is retarded with respect to the timing of the release of the record mode.

As is apparent from the foregoing, according to the present invention, the retaining mechanism of the mode switch operating means of the tape recorder is composed of a retaining plate and a retaining slider each provided with window holes through which retainer pins are disposed. In particular, the record mode retaining operation may be achieved by the retainer plate and the pause mode retaining operation may be achieved by the slider plate, respectively. Therefore, when it is desired, in the record pause mode, for the pause mode to be released, the release is achieved by the playback mode driving means. Thus, the driving system may be simplified and the number of plungers may be reduced.

Also, as is apparent from the foregoing, the retaining period of the pause mode is selected to be longer than that of the other modes, and therefore, when the record pause mod is changed to the stop mode, no record mode is intermediately achieved.

With such a construction, for example, when the plunger for the playback mode is activated, the lock arm 28 is rotated to thereby release the engagement between the retainer pin 27b of the clutch gear 27 and the lock arm 28, as a result of which the clutch gear 27 is engaged with the drive gear 26. For this reason, the cam 27c is rotated with the clutch gear 27, and by the cam 27c the actuating arm 292 is pushed to thereby actuate the playback operating lever 81. Then, the retainer pin 81a is moved together integrally with the operating lever 81 and is retained at the step 315b of the hole 315. Therefore, the operating lever 81 is held at a position maintaining the playback mode.

Subsequently, when it is desired to release the playback mode and operate the stop mode mechanism as in the foregoing, the stop mode operating lever 41 is moved so that by the action of the retainer pin 41a and the cam projection 311a of the window 311 of the retainer plate 31, the retainer plate 31 is moved upwardly. Then, the retainer pin 81a of the playback mode operating lever 81 is disengaged from the retaining step 315b to restore it to the original position, so that the playback mode may be released.

On the other hand, in this case, if the eject lever 4 is actuated instead of the operation of the stop mode, the retainer plate 31 is moved upwardly in the same manner to thereby release the playback mode.

As is apparent from the foregoing, the fast forward mode, rewind mode, etc. may similarly be released by the operation of the eject lever 4.

As is apparent from the foregoing, in the tape recorder equipped with the eject means according to the present invention, the eject lever 4 serves not only to eject the cassette case but also to release the retaining operation of each mode. The eject lever is made to cooperate with the retainer plate 31 for releasing the mode operating levers in the same manner as in the stop operation. Accordingly, in case it is impossible to supply electric power to the tape recorder, the mode engaged may be released by the eject lever 4 without damage to the tape recorder or the cassette tape. Thus, in any case, the cassette case may be removed from the tape recorder. Also, in the case of the ordinary removal of the cassette case, the operation of the stop mode may be dispensed with, by direct operation of the eject lever. Thus, the operations required may be greatly reduced.

For example, in a case where the cassette case is removed while the eject lever is actuated after the release of the playback mode to open the cassette door, the retainer plate coacting with the eject lever 4 is moved upwardly as in the stop mode to thereby release the respective modes. More specifically, the steps 312b, 313b, 315b and 316b of the window holes 312, 313, 315 and 316 corresponding to the respective modes are located at positions higher than those of the retainer pins 51a, 61a, 81a, and 91a. For this reason if an operating lever is then erroneously manipulated to thereby move the retainer pin together with the operating lever, the engagement between the step formed on the window and the retainer pin is not achieved, so that the operation in question may be cancelled.

As is apparent from the foregoing, in the tape recorder according to the present invention, since the eject lever 4 is constructed so that by the operation of the eject lever, the retainer plate 31 for retaining the respective mode operating levers except for the pause mode may be used to release the levers, if the modes except for the pause mode are selected erroneously when the cassette case is removed by the operation of the eject lever 4, the tape recorder is not operative and is maintained in the inoperative condition. Therefore, it is not possible for the cassette case to be operated upon in an insufficiently set condition or for the cassette case to be forcibly set during the rotation of the pinch roller.

What is claimed is:

1. In a tape recorder having a chassis, a flywheel and related operating mechanisms provided on one side of the chassis and a plurality of mode operating levers for switching the operational modes thereof; the improvement wherein said plurality of mode operating levers are arranged so as to be reciprocatingly movable in the longitudinal direction of the chassis in parallel to one another, said flywheel being disposed so as to confront the chassis and maintaining a distance from and providing space for the mode operating levers and at a remote portion of the chassis, whereby the motion of operating mechanism for the flywheel may not interfere with the motions of the mode operating levers.

2. A recorder as claimed in claim 1, wherein said flywheel is driven by motor means located on said chassis remote from said mode operating levers.

3. A recorder as claimed in claim 1, wherein said mode operating levers include relatively sliding elements movable longitudinally of said chassis and located at one end thereof.

4. A mode switch operating device for a tape recorder, comprising; a plurality of mode operating levers, each being provided with a retaining pin; a retainer plate and a retainer slider, each movable in a direction perpendicular to the direction of movement of said mode operating levers, said plate and said slider being provided with window holes through which the retaining pins of said operating levers pass, said plate and said slider being biased to move in opposite directions relative to each other, at least some of said window holes of said retainer plate being provided with a retaining portion at a periphery thereof opposite to the biasing direction thereof.

5. A mode switch operating device as claimed in claim 4, wherein said window holes in said plate corresponding to playback and record levers include said retaining portions, a window hole in said plate corresponding to a pause lever lacking said retaining portion.

6. A mode switch operating device as claimed in claim 5, wherein said window hole of said slider corresponding to said pause lever includes a retaining portion at a periphery thereof opposite the biasing direction thereof, for engaging a retaining pin of said pause lever.

7. A mode switch operating device as claimed in claim 6, including a stop lever having a pin thereon, a window in said plate corresponding to said stop lever including a cam portion for engaging said pin whereby said plate is moved in a direction opposite the biasing direction thereof, the movement of said plate acting to release said retaining pins from said retaining portions of said plate windows.

8. A mode switch operating device as claimed in claim 7, further including an eject mechanism including means for moving said plate a said opposite direction, to release said retaining pins from said retaining portions of said plate windows.

9. A mode switch operating device as claimed in claim 7, including means for releasing said pause lever retaining pin from said slider window retaining portion, comprising cam means operable in response to actuation of said playback lever for effecting movement of said slider in a direction opposite the biasing direction thereof.

10. A mode switch operating device as claimed in claim 9, said retaining portion of said pause lever slider window being operable to maintain a retained position for a time longer than that of said playback or record levers, whereby said pause operation is maintained effective until after release of said retaining pins of said playback and record levers.

11. A mode switch operating device for a tape recorder, comprising; a plurality of mode operating levers provided with retaining pins, a retainer plate and a retainer slider which are movable in directions perpendicular to a moving direction of said mode operating levers, said plate and said slider being provided with window holes through which the retaining pins of said operating levers pass, said retainer plate and said retainer slider being spring-biased to move in directions opposite to one another, window holes of said retainer plate through which the retaining pins of the mode operating levers for playback and record modes being each provided with a retaining portion at a periphery thereof opposite to the spring-biasing direction of the plate, a retaining portion being lacking in a window hole of the retainer plate through which the retaining pin of the mode operating lever for a pause mode passes, a retaining portion for said pause lever being provided in a window of said retainer slider through which a retaining pin of said pause lever passes at a periphery opposite to the spring-biasing direction thereof; the pause lever retaining portion, at a periphery thereof, having a length greater than that of retaining portions of any other window, whereby after the operating lever for the playback mode is released, the operating lever for pause mode is then released.

12. An eject device for a tape recorder comprising; a chassis, a plurality of mode operating levers for respective modes, said levers having retainer pins and being arranged in parallel to each other, a retainer plate having window holes through which the retainer pins extend, said plate being movable in a direction perpendicular to a moving direction of the mode operating levers, said retainer plate being biased in one direction, a retaining portion for retaining said retainer pins corresponds to the respective modes being formed in selected ones of the window holes, a cam projection for releasing respective retaining operations by moving said retainer plate being provided in the window hole corresponding to a mode operating lever for a stop mode, and eject lever means extending through a hole in said chassis including means for moving said retainer plate in the same direction as that effected by the operation of the stop mode operating lever.

13. An eject device for a tape recorder, comprising; a plurality of mode operating levers including retainer pins for respective modes, said levers being arranged parallel to each other, a retainer plate having window holes through which the retainer pins extend, said plate being movable in a direction normal to a moving direction of the mode operating levers, said retainer plate being biased in one direction retaining portions for retaining said retainer pins corresponding to the respective modes being formed at peripheries of selected window holes on the sides thereof opposite to said biasing direction, and eject lever means for releasing the engagement between the retainer pins and the retaining portions of said retainer plate, whereby by the operation of said eject lever, any mode other than a pause mode is released.

* * * * *